March 17, 1953   J. F. CACHAT ET AL   2,632,092
MEANS AND METHOD FOR HIGH-FREQUENCY INDUCTION HEATING
Filed June 9, 1949   2 SHEETS—SHEET 1
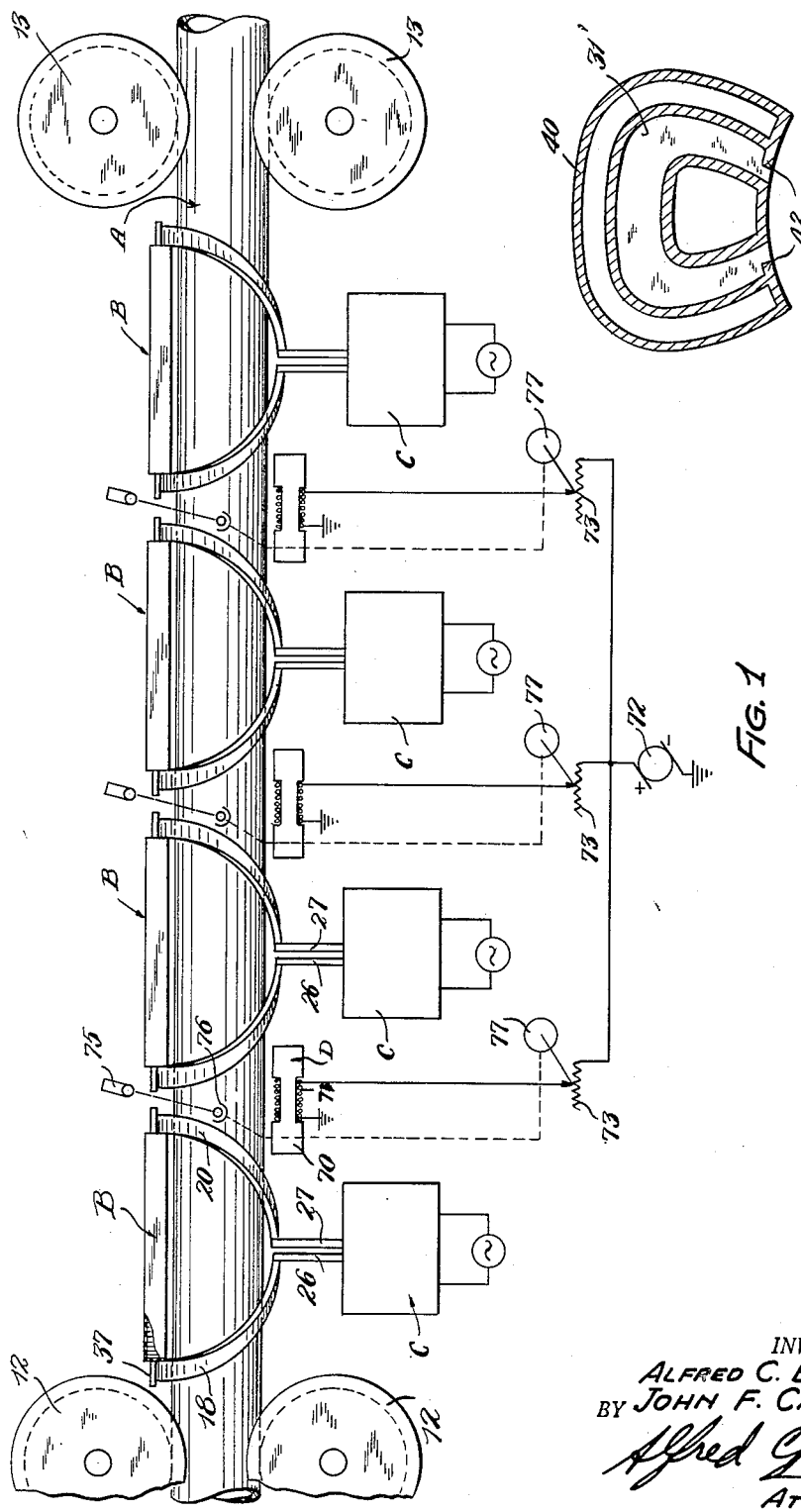
INVENTOR.
ALFRED C. BODY
BY JOHN F. CACHAT
ATTORNEY

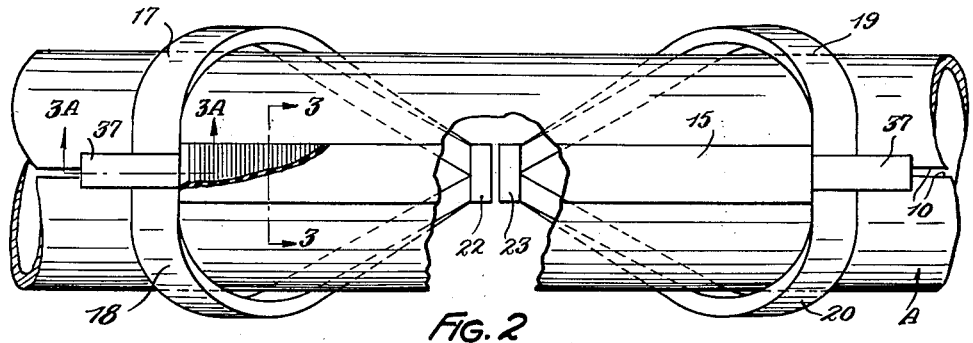
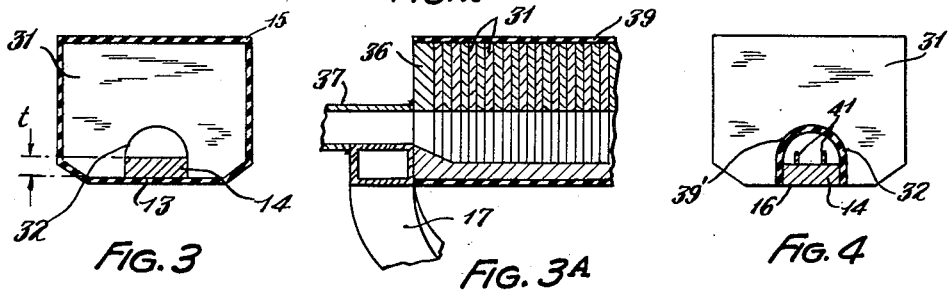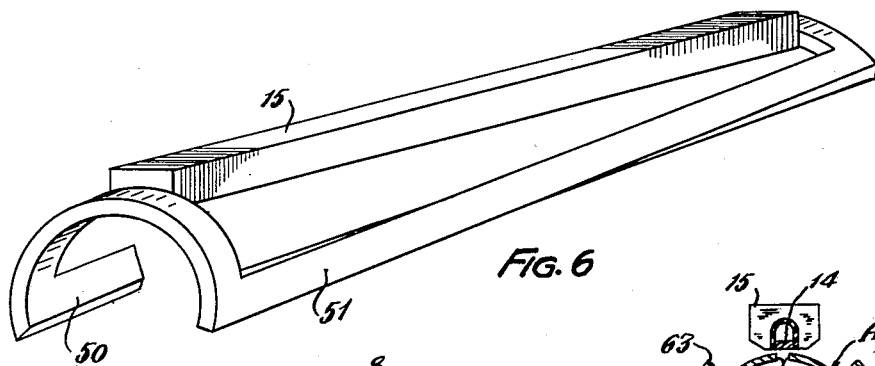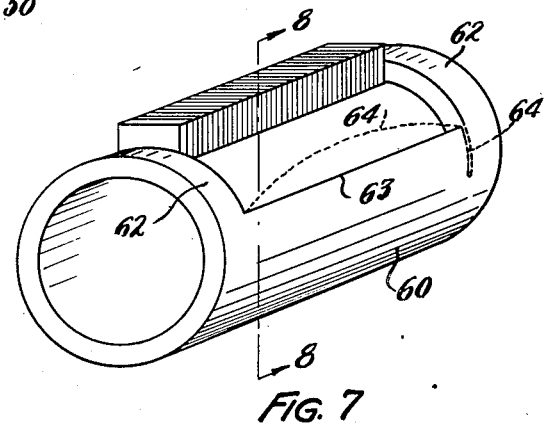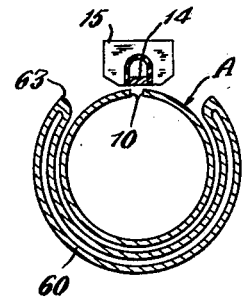

Patented Mar. 17, 1953

2,632,092

UNITED STATES PATENT OFFICE 2,632,092

MEANS AND METHOD FOR HIGH-FREQUENCY INDUCTION HEATING

John F. Cachat and Alfred C. Body, Cleveland, Ohio, assignors to The Ohio Crankshaft Company, Cleveland, Ohio, a corporation of Ohio Application June 9, 1949, Serial No. 98,104

10 Claims. (Cl. 219—47)

This invention pertains to the art of high-frequency electric induction heating, and more particularly, to high-frequency inductor design, construction and its associated apparatus.

The invention will be described with particular reference to heating the opposed adjacent edges of C-shaped metallic tube or pipe prior to the pressure or butt welding of the heated edges. It will be appreciated, however, that the invention, in many of its aspects, is not limited to this field and is broadly usable in the art of high-frequency induction heating.

The invention, in some of its aspects only, constitutes improvements on, although not limited to, a high-frequency inductor of the type shown in the applications of Phillips N. Sorensen, Serial No. 58,228 and Serial No. 86,066. The inductor there shown comprises a main conductor having laminations thereabout which is adapted to be disposed in close-spaced, parallel relationship to the edges to be heated and induces currents to flow in concentrated form along the edges. The inductor also has auxiliary conductors spaced from the main conductor in close-spaced relationship to the pipe which aids in the electric coupling of the inductor to the pipe but are intended to induce currents in a relatively unconcentrated form so as not to cause any undue heating of the pipe or tube.

The inductor of Sorensen, as do many other high-frequency inductors, has an unbalanced or unsymmetrical magnetic field relative to the workpiece which attracts or pulls the pipe, if of a magnetic material, toward the inductor. The pipe is usually unsupported while within this magnetic field and, if the unsupported span is sufficiently large, the rigidity of the pipe is not sufficient to resist the magnetic forces. The pipe is liable to rub the inductor. As pipe and welding speeds increase, the inductor must generally be lengthened out with the consequent increase in the length of the unsupported span to the point where this trouble may occur. As power and inductor length must increase with the speed of the pipe, this unsymmetrical magnetic field tending to draw the pipe into contact with the inductor places a limit on the length of the span and, thus, on the speed of welding which can be effected.

The main or principal conductor shown by Sorensen had a substantial width in the radial direction of the pipe. Because of the proximity effect in high-frequency induction heating wherein substantially all of the current concentrates in the surface next to the workpiece, only a portion of the conductor is used to carry currents. In fact, insofar as is now understood, some of the magnetic flux actually penetrates the interior of the conductor remote from the workpiece and sets up currents flowing in the opposite direction to the principal or main current. These induced currents in the conductor simply increase the losses without giving any beneficial heating effects.

Further, the auxiliary or side conductors of Sorensen are parallel to the axis of the pipe and the return currents of the main heating currents tend to concentrate thereunder, giving a current concentration relatively low as far as the main heating currents, but yet high enough to effect a substantial heating of the pipe. This heat is a net power loss to the welding problem.

The present invention contemplates and has for one of its objects, means for overcoming and offsetting the unbalanced or unsymmetrical field of a high-frequency inductor, such as an auxiliary magnetic field disposed relative to the workpiece so as to oppose the effects of the unbalanced inductor magnetic field.

The invention further contemplates and has for an object, a conductor for high-frequency induction heating having a thickness substantially equal to the depth of current penetration and having, if necessary, a water-cooling passage associated therewith formed by means nonconducting at least in the length of the conductor, the means in the preferred embodiment including relatively insulated magnetic laminations which serve to concentrate the heating flux.

Another contemplation and object of the invention is the provision of a new and improved inductor having a main conductor for continuously heating narrow portions of a moving workpiece and auxiliary conductors for improving the coupling of the inductor to the workpiece so arranged that a very considerable area of the pipe remote from the edges to be heated passes under the auxiliary conductors to decrease the heating of the workpiece at points remote from the portion to be heated.

Still another object is to provide a new and improved inductor having a minimum of internal losses which is capable of inducing currents to flow in a workpiece in the most efficient manner.

Other and more specific objects will appear upon a reading and understanding of the following specification.

The invention resides in certain constructions, arrangements and combination of parts and certain dimensioning of parts, preferred embodiments of which will be described hereinafter in conjunction with the accompanying drawings which are a part hereof, and wherein:

Figure 1 is a generally schematic view of a pipe or tube passing the heating station of a seam-welding machine, including inductors and associated apparatus, embodying the present invention.

Figure 2 is an enlarged perspective view of an inductor embodying the present invention, the relationship of the inductor to the pipe being shown in Figure 1.

Figure 3 is a sectional view of Figure 2 taken substantially on the line 3—3 thereof, showing the constructional details of the main or principal branch of the inductor.

Figure 3a is a sectional view on the line 3a—3a of Figure 3 showing constructional details.

Figure 4 is a view similar to Figure 3 but showing a modified construction of the main conductor.

Figure 5 is a view similar to Figure 3 but showing a still further modified form of the main branch and including a shield about the laminations.

Figure 6 is a view similar to Figure 2 but showing a modified form of the inductor and, particularly, of the formation of the auxiliary or side conductors.

Figure 7 is a view similar to Figure 2 but showing a still further modified form of inductor.

Figure 8 is a sectional view of Figure 7 on the line 8—8 thereof.

Referring now to the drawings wherein all the embodiments of the invention shown are simply for the purposes of illustration only and not for the purposes of limiting the scope of the invention by their specific showing, Figure 1 shows a tube A having a pair of slightly-spaced, opposed edges 10 to be welded moving from left to right past a plurality of high-frequency inductors B, which inductors induce high-frequency electric currents to flow in the tube to heat the edges 10 to the welding temperature.

The inductors B are supported in position by a plurality of transformers C, each of which is connected to a suitable source of high-frequency current, the inductors B having a strong high-frequency magnetic field thereabout, which field is unbalanced relative to the tube A and tends to draw the tube into engagement with the inductors themselves. Figure 1 further shows a plurality of magnets D and associated-control apparatus disposed relative to the tube A so as to counteract the unbalanced magnetic field of the inductors and prevent the tube from being drawn into engagement therewith.

The tube A may have any desired cross-sectional shape and may be made of any electrically-conducting material which, when heated to the plastic state, can be welded by pressing the heated portions into firm pressure engagement.

The tube A moves from a pair of driving rolls 12 disposed on the left side of the inductors B past and in close proximity with the inductors B and thence into a pair of pressure-welding rolls 13 and disposed on the right hand of the inductor B. The edges 10 are uppermost in this embodiment.

Figure 1 shows four inductors B being employed to heat the edges 10 of the tube A. More or less could be employed. The limiting factor on the number of inductors is actually the amount of power which each transformer C can handle and for each inductor B can handle. The amount of power which is required depends on many factors but, particularly, on the speed of the pipe. Thus, the number of inductors and the speed of the pipe are inter-related very closely. It will be appreciated, of course, that the inductors B could all be made in one and the transformers connected in series therewith.

The inductor, which it is preferred to use to heat the edges of the pipe 10, is shown in greater detail in Figure 2. The inductor shown comprises a main branch 15, including a conductor 14, having a lower surface 16 which extends in close-spaced, parallel relationship to the edges 10 for any suitable distance, dependent upon the amount of power used and the speed of the tube A. The inductor also comprises side or auxiliary conductors 17, 18, 19 and 20 so arranged as to envelop a substantial portion, in this case 360 degrees, of the periphery of the tube A. The side or auxiliary conductors 17, 18 are connected to and extend from opposite sides to the right-hand end of the main conductor 14 in the form of a helix advancing to the left, downwardly around the bottom side of the tube A, whence they meet and are electrically connected as at 23. The ends of the conductors 17, 18 on the bottom side of the pipe are closely spaced to but insulated from the ends of the conductors 19, 20 at the same location. Fish-tail leads 26, 27 lead downwardly each from the connections 22, 23 to the terminals of the transformer C. The auxiliary conductors 17, 18, 19 and 20 and the fish-tail leads 26, 27 are artificially cooled and may be formed of a hollow copper tubing through which water is circulated.

In some instances, the conductors 18, 19 may be omitted, thus providing only a single loop around the pipe. Also, the fish-tail leads may connect to the inductor elsewhere than as shown.

The main branch 15 is preferably provided with a magnetically-permeable material which surrounds the conductor 14 on the sides other than the side 16 facing the tube A.

High-frequency currents flow through the inductor, for example, up the fish-tail lead 26, to the left and up in the auxiliary conductors 17, 18 to the right in the main conductor 14, thence downwardly around the tube A to the left in the conductors 19, 20 and thence down the fish-tail lead 26 and the transformer. These high-frequency currents flow in the inductor B and set up a high-frequency magnetic field which threads through the tube A and induces corresponding high-frequency currents to flow in the tube A. Because the current divides at 19 and 20, there is twice as much current flowing in the main conductor 14 as in each of these auxiliary conductors. Because of the magnetically-permeable material and because of the higher currents, the currents induced in the edges 10 are of a very high order and are very concentrated. The amount of the current is such that the edges can be raised a total of 2600 degrees F. in less than three tenths of a second! The auxiliary conductors tend to induce concentrated currents in the tube A in proportion to their current flow. However, these indirect currents flow in almost the entire portion of the tube remote from the edges 10. Thus, the resistance of the current path is a minimum and the $I^2R$ heating is a minimum. As heating remote from the edges is undesirable and inefficient, the result is an increase in heating efficiency.

At any one instant, the current induced in the tube by the side conductors flows in a relatively small or incremental volume of the metal of the tube A. The integrated volume of the metal in which the current flows is an absolute maximum. Insofar as is understood, causing the currents to flow in such a manner gives an increase in the over-all efficiency of the inductor not heretofore obtainable. The resistance of the metal in which the current flows is the absolute minimum because the absolute maximum volume of metal is utilized by the return currents. Also, as the temperature of this portion of the tube is held down, the resistance remains lower and the losses are still further held down.

Figure 3 shows in detail a preferred construction of the main branch 15. The conductor proper is shown at 14 and comprises a solid rectangular bar of copper or other electrically-conducting material having a width corresponding generally to the width of the desired heat band in the tube A and a thickness "$t$" which is a function generally of the thickness of current penetration at the particular frequency supplied by the high-frequency power source. This current penetration in inches for copper equals generally $$\sqrt{\frac{7.3}{F}}$$

where F is the frequency in cycles per second of the power. It has been found that the thickness "$t$" should be approximately 1.4 times the depth of current penetration. Thus, the thickness "$t$" should be in the neighborhood of .069 inch for three-thousand cycles per second and in the neighborhood of .038 inch for ten-thousand cycles per second. As the current always tends to concentrate on the workpiece-adjacent side of a conductor, all of the conductor 14 is utilized for carrying current in the desired direction. No eddy currents in the opposite direction can be established. The dimensions of the drawing are exaggerated for the purpose of clarity, although it will be appreciated that for the purposes of obtaining physical rigidity of the conductor itself, the thickness dimension may be increased somewhat over the theoretical amount. Within limits, an increase to two times the current penetration expected will not introduce appreciable electrical losses.

Magnetically-permeable material such as laminations 31 surround the conductor 14 on the three sides away from the tube A. These laminations are generally U-shaped as shown and the inside base of the U is spaced from the upper side of the conductor 14, thus forming a continuous passage 32 over the length of the conductor 14. Water or other cooling mediums are circulated through the passage 32 to remove heat developed in the conductor 14 as a result of $I^2_R$ losses or in the laminations 31 as a result of hysterisis losses. Each lamination should preferably have a thin layer of insulation between the adjacent lamination. Thus, the cooling passage is formed by a material insulated at least along the length of the conductor 14. The currents in the conductor 14 can only induce longitudinal currents in the tube A and not anywhere else and, particularly in the laminations 31. If laminations were not employed, a non-conducting material such as rubber could be employed to form the passage.

In order to provide a water connection to the passage 32, the last lamination in each stack is preferably a copper plate 36. A copper tube 37 is brazed onto the plate 36 and the other portions of the inductor to provide a fluid-tight water passage to the passage 32. See Figure 3a.

In the preferred embodiment shown in Figure 3, the stack of laminations 31 and the conductor 14 are coated on the outside with a thin waterproof, heat-resistant coating 39 which extends the entire length of the laminations and over the copper plate 36 at the end.

The groove of the laminations into which the conductor 14 fits is defined by side walls which are disposed relative to the adjacent side walls at an included angle greater than 135° to lower the flux concentration at the corner if the angle were 90° as heretofore. In the embodiments shown, the angle has been smoothed out to a maximum and is a smoothly-curved surface.

Figure 4 shows an alternative arrangement for making the passage 32 water proof. In Figure 4, a thin water-proof layer of material 39' covers the entire inner surface of the legs of the laminations.

The side of the conductor 14 opposite to the surface 16 may have fins 41 or other area-increasing means to aid in the transfer of heat to the cooling water.

Referring now to Figure 5, a further modification of the invention is shown wherein means are provided for restricting the width of the flux flow into the tube A. This means, in the embodiment shown, comprises a hollow water-cooled copper shield 40 disposed on the outer three sides of the laminations 31'. The shield extends preferably the full length of the laminations and is insulated therefrom. For some purposes, it has been found desirable to use a lip 42 on the lower edge of the shield extending partway across the ends of the lips of the laminations 31' so as to further restrict the width of the flux flow while still allowing a sufficient area of laminations remote from the lip 42 to carry high concentrations of flux without saturating or over-heating.

Referring now to Figure 6 wherein a modified embodiment of the inductor of Figure 2 is shown, here the inductor comprises the main branch 15 and a pair of auxiliary or side conductors 50, 51 which extend at an angle relative to the main conductor 14 but in close-spaced, coupled relationship to the sides of the tube A. In the embodiment shown in Figure 6, these conductors diverge from the main conductors 14 as they extend from right to left. It will be appreciated that they could diverge otherwise, either similarly or in an opposite manner; e. g., the conductor 51 could diverge from left to right while the conductor 15 diverges from right to left. In either instance, the conductors sweep or envelop a substantial area of the tube.

Figure 7 shows a still further modified form of inductor from that shown in Figure 2. Here, the auxiliary or side conductor is formed as a sleeve 60 which envelops the tube A through approximately 270 to 300 degrees. Connectors 62 from the ends of the sleeve 60 connect with the conductor 14 of the main branch 15, thus providing a complete electrical circuit. In some instances, it has been found that the current tends to concentrate along the upper edge 63 of the sleeve 60. To prevent this, a slit 64 may be provided separating the connector 62 from the sleeve 60 throughout a greater portion of its length. Thus, the currents enter the sleeve 60 remote from an edge where currents would tend to concentrate. Alternatively, the edge 60 may be bowed as at 64 toward the main conductor 15 or both constructions may be employed. The sleeve 60 may be water cooled as is conventional practice. No power connections are shown for the inductor of Figure 7. These power connections may be provided by either splitting the main conductor 15 or by dividing the tube 60 in two and connecting the power connections on opposite sides of the split. This construction is more fully described and claimed in our copending patent application Serial No. 223,112 filed April 26, 1951.

Returning now to Figure 1, all of the inductors heretofore described and many others have an unsymmetrical magnetic field relative to the workpiece. In the embodiment shown in Figure 1, a substantial span exists between the feed rollers 12 and the welding rollers 13. If the metal of tube A is of a magnetic material, the span may be sufficient, depending on the rigidity of the tube A, that the unsymmetrical magnetic field will deflect the tube A from its normal path such that the tube will actually contact the inductors B. The field normally tends to repel the tube if of a nonmagnetic material.

The present invention contemplates means for counter-acting or balancing the unsymmetrical magnetic field of the inductors B. Such means may comprise the magnets D which are disposed in the space between the individual inductors B. In the particular installation shown, three magnets were necessary. More or less could be employed.

The magnets D comprise a core 70 of magnetic material having a centrally-disposed winding 71 thereabout. The ends of the core 70 are spaced in close proximity to the tube A. One end of the winding is grounded. The other end of the winding 71 connects to a suitable power source, such as a D. C. generator 72 through means for controlling the strength of the magnetic field, such as a rheostat or variable resistance 73. Each magnet D in the embodiment shown is individually controlled. All of the magnets could be energized through a single rheostat. The amount of force which the magnets D sould exert on the tube A if of a magnetic material depends on the degree of deflection of the tube A toward the inductors B. It is preferred to use automatic control to control the force of the magnets such as a light source 75 disposed on the opposite side. The photoelectric cell controls a motor 77 which, in turn, automatically varies the rheostat 73. Such controls are well known and will not be detailed here. It is preferred that the line connecting the light source 75 and the photoelectric cell 76 be just over the top of the tube A. Thus, as the tube A tends to move toward the inductors B, the light from the light source 75 falling from the photoelectric cell 76 will be diminished and the rheostat 73 will be readjusted by the motor 77 to increase the current flowing in the winding 71 and, thus, establishing a stronger magnetic pull by the magnets D on the tube A to return it to its normal position.

The arrangement of inductors external to the tube A as shown in Figure 1 is preferred for small wall thickness. As the wall thickness increases to where uniform heating across the edge becomes difficult, and the tube diameter permits, an inductor may be used internally of the tube simultaneously with the external inductor. Such an internal inductor is not shown as its preferred construction may be simply that of the inductors shown turned inside out. The internal inductor would then be energized at one end preferably toward the tube entrance end so that the fish-tail leads can come through the split adjacent the edges 10 while still unheated. The inner and outer inductors may, of course, be connected either in electrical series or parallel relationship or separately energized. The currents in the two main conductors should be in phase.

In some instances, a ceramic tube may be in the inductors shown as a guide for the tube A and to prevent electrical contact of the tube A with the surfaces of the inductor. Arcing resulting from accidental contact is thus prevented. Preferably, a shock-resisting ceramic should be employed.

The invention has been described in terms of specific and preferred embodiments. It will be appreciated that there are many other embodiments of the invention which will differ radically in appearance from those shown in the attached drawings and, yet, be in accordance with the invention. Such different-appearing embodiments will occur to others upon a reading and understanding of this specification. It is our intention that the invention is to be defined by the following claims:

Having thus described our invention, we claim:

1. High-frequency, induction-heating apparatus, comprising, in combination, a main inductor having an unsymmetrical magnetic field relative to a workpiece and tending to move said workpiece from a normal desired position, said inductor being of the type which induces heating currents to flow in said workpiece; means for counteracting the effect of said unsymmetrical magnetic field, said means comprising an auxiliary magnetic field disposed relative to the inductor and workpiece so as to offset and counteract the effect of said unsymmetrical magnetic field, said means being of the type which generally does not induce heating currents to flow in the workpiece.

2. The combination of claim 1, including means sensitive to the position of the workpiece for controlling the strength of the auxiliary magnetic field on the workpiece.

3. A high-frequency, electric inductor for continuously heating narrow elongated lengths on a continuously-moving workpiece comprising a generally-elongated, longitudinally-extending, straight, main conductor in close-spaced, parallel relationship to the portion of a workpiece which it is desired to heat; an auxiliary branch, including a generally-elongated conductor electrically connected with the ends of the conductor of the main branch and extending generally longitudinally of said workpiece and at an angle relative to said main conductor over substantially its entire length and in close coupled relationship with portions of the workpiece where heating is not desired.

4. A high-frequency, electric inductor for continuously heating narrow elongated portions on a continuously-moving workpiece comprising, in combination, a generally-elongated, main conductor, in close-spaced, parallel relationship with the portion of said workpiece to be heated; a generally-elongated auxiliary conductor, electrically connected to the ends of the main conductor, said auxiliary branch extending generally longitudinally of said workpiece and progressively over its length enveloping at least 180 degrees of the periphery of the workpiece.

5. The combination of claim 4 wherein the auxiliary branch comprises a conductor extending in the form of a helix about the workpiece from one end of the main branch to the other.

6. The combination of claim 4 wherein the auxiliary branch comprises a pair of conductors, each extending from an opposite side of the main branch at one end in the form of a helix about the workpiece and to the corresponding sides of the main branch at the other end.

7. The combination of claim 4 wherein the conductor of the main branch comprises a solid copper member having a thickness dimension in inches transverse to the workpiece equal approximately to $$\sqrt{\frac{7.3}{F}}$$

wherein F equals the frequency of the power source in cycles per second.

8. In combination, a high-frequency, electric inductor and a high-frequency power source electrically connected to said inductor, said inductor, including a copper conductor, having a workpiece-adjacent surface, the thickness dimension in inches of said conductor transverse to said surface being equal to $$\sqrt{\frac{7.3}{F}}$$

wherein F equals the frequency of the source in cycles per second, and a cooling medium passage defined on one surface by a surface of said conductor other than the workpiece-adjacent surface and, on the other surfaces, by means nonconducting in at least the longitudinal length of said conductor.

9. The combination of claim 8 wherein said means comprises a plurality of magnetically-permeable laminations having their principal plane transverse to the longitudinal length of the conductor, said laminations having a degree of electrical insulation therebetween.

10. In a high-frequency, induction-heating apparatus comprising, in combination, a plurality of high-frequency inductors arranged in tandem relationship, each of said inductors comprising a main branch and auxiliary branches, said main branch including a conductor of solid electrical-conducting material having a thickness in inches equal to the $$\sqrt{\frac{7.3}{F}}$$

wherein F equals the frequency of the power source in cycles per second, said conductor having an elongated workpiece-facing surface; magnetic laminations about surfaces of said conductor other than said workpiece-facing surface and defining with said conductor a water-cooling passage for cooling the conductor, said auxiliary branches comprising conductors extending from said main conductor at an angle relative thereto for substantially their entire length to envelop a substantial periphery of a workpiece, said inductors having an unsymmetrical magnetic field relative to the workpiece, and means for counteracting the effect of this unsymmetrical magnetic field comprising an auxiliary magnetic field disposed on the side of said workpiece opposite to the side of said main branch.

JOHN F. CACHAT.
ALFRED C. BODY.

REFERENCES CITED

The following references are of record in the file of this patent:

UNITED STATES PATENTS

| Number | Name | Date |
| --- | --- | --- |
| 1,448,700 | Seidner | Mar. 13, 1923 |
| 1,981,629 | Northrup | Nov. 20, 1934 |
| 2,005,901 | Long | June 25, 1935 |
| 2,054,086 | Jones | Sept. 15, 1936 |
| 2,475,348 | Black | July 5, 1949 |
| 2,477,029 | Wood | July 26, 1949 |
| 2,483,973 | Goettings | Oct. 4, 1949 |
| 2,493,950 | Dow et al. | Jan. 10, 1950 |

FOREIGN PATENTS

| Number | Country | Date |
| --- | --- | --- |
| 70,478 | Norway | May 27, 1946 |
| 616,063 | Great Britain | Jan. 14, 1949 |
| 951,765 | France | Nov. 3, 1949 |

OTHER REFERENCES

Terman, "Radio Engineers' Handbook," 1943, pp. 30–35.

Curtis, "High Frequency Induction Heating," 1944, p. 204.